United States Patent Office

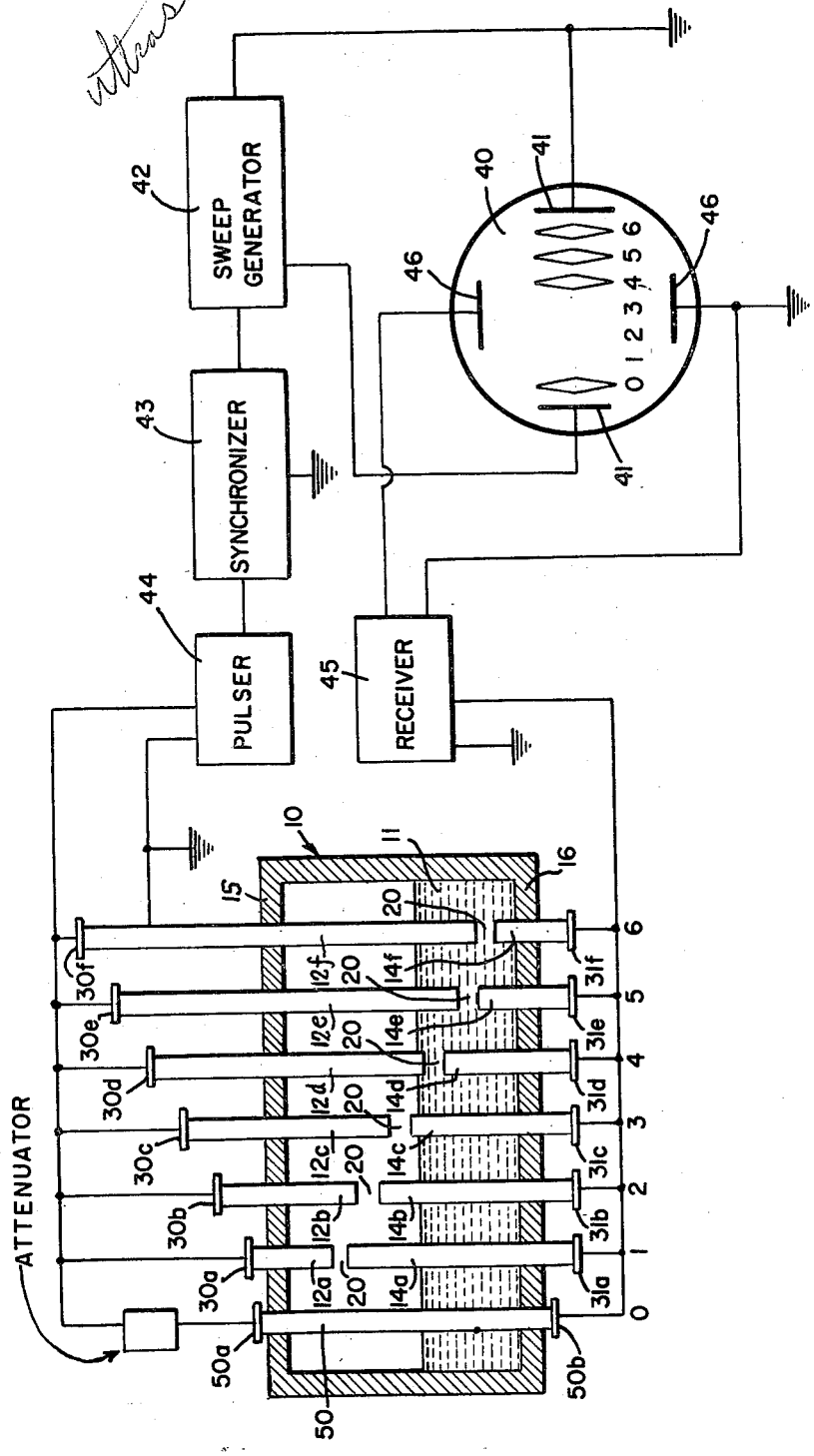

2,883,861
LIQUID LEVEL INDICATOR

Howard E. Van Valkenburg, Candlewood Isle, and Raymond E. Sansom, Bethel, Conn., assignors to Sperry Products, Inc., Danbury, Conn., a corporation of New York Application June 14, 1957, Serial No. 665,860

4 Claims. (Cl. 73—290)

This invention relates to means for measuring the liquid level within a container by ultrasonic means. A large number of liquid level measurement problems cannot be solved with presently known techniques. Such problems arise, for example, in a variety of atomic reactor applications involving sealed tanks having high temperatures, turbulence, bubbling, pressure, or corrosive conditions.

It is an object of this invention to provide an ultrasonic liquid level measuring device capable of absolute calibration because it does not depend on the velocity of the ultrasonic vibrations in the liquid.

It is a further object of the invention to provide an ultrasonic liquid level indicator which may employ high frequencies and thus permit the use of small piezoelectric transducers.

It is a further object of this invention to provide an ultrasonic liquid measuring device which does not depend upon the reflection of pulses from a discontinuity, and thus there is eliminated problems due to reverberation in tank walls, reflections from bubbles and similar conditions.

Further objects and advantages of this invention will become apparent in the following detailed description thereof.

The accompanying drawing is an assembly view partly sectioned vertically and partly diagrammatic showing one embodiment of this invention.

Referring to the drawing, there is disclosed a tank 10 within which there is a body of liquid 11, whose depth is to be determined. For this purpose there is provided a series of rods 12a, 12b, 12c, and so forth, extending through the top 15 of tank 10, and fastened thereon as, for instance, by welding. The portions of the rods extending into the tank are of progressively increasing length from a point adjacent the top of the tank to a point adjacent the bottom of the tank. Cooperating with the rods 12a–12f is a series of rods 14a–14f extending through the bottom wall 16 of tank 10 and fastened therein in any suitable manner, as, for instance, by welding. The rods of each pair are in alignment and are spaced from each other lengthwise to provide a small gap 20 to form a discontinuity. A piezoelectric element 30a, 30b–30f is applied to the outer end of each of the upper rods and a similar piezoelectric element 31a, 31b–31f is applied to the outer end of each of the lower rods.

It will now be seen that if the piezoelectric elements 30a–30f are energized to generate ultrasonic pulses, such pulses will travel down rods 12a–12f. If no liquid appears to close the gap 20, the pulses will not be transmitted to the corresponding lower rods. This is the case in the example shown in the drawing with respect to rods 12a, 12b and 12c because there is an air gap sufficient to prevent transmission of the pulses to the corresponding lower bars 14a, 14b, 14c. However, the gap 20 between upper rod 12d and lower rod 14d is closed by the liquid which is a good transmitter of sound, and hence the pulse generated by crystal 30d will be transmitted through rod 12d, the liquid 20, rod 14d to the receiver crystal 31d. The same is true with respect to the pair of rods 12e—14e and 12f—14f.

In order to utilize the foregoing arrangement to give an indication of liquid depth, there may be employed the oscilloscope 40 having horizontal plates 41 between which a sweep is generated by a sweep generator 42 energized periodically by a synchronizer 43. The synchronizer may also energize a pulse generator 44 so that these pulses are synchronized with the sweep. The pulses generated by pulser 44 are applied simultaneously to the entire set of transmitting transducers 30a–30f which are connected in parallel. The receiving transducers 31a–31f are also connected in parallel and their output is fed to a receiver amplifier 45 so that the amplified signal may be applied to the vertical plates 46 of the oscilloscope to deflect the sweep if a signal is received by any of the transducers 31a–31f.

The sweep of the oscilloscope represents a certain time interval, and in order that discrete indications along the sweep corresponding to the respective pairs of rods may be obtained, the sum total length of the pairs of rods (including the gap 20) is made progressively longer. The time of travel of the pulse from the transmitting transducer to the receiving transducer will thus be different for each pair of rods, and the received signals will appear at different points along the sweep length. The different effective lengths of the pairs of rods may be obtained by making the portions of the rods 12a–12f projecting outside the tank of increasing length. Thus, for the six pairs of rods, pulses received by their receiving transducers 31a–31f will appear on the oscilloscope sweep at the six spaced points shown.

Referring to the oscilloscope 40, it will now be seen that the pair of rods in position 1 corresponding to high depth of liquid will not transmit the pulse because of the attenuation by air gap 20, and a blank will appear at position 1 of the sweep corresponding in time to the time it would take the pulse to travel through rods 12a—14a and the gap 20. Similarly, no indication appears on the oscilloscope at position 2 or position 3 corresponding to the time it would take the pulse to travel the increasing lengths of rods 12b—14b and 12c—14c and their gaps 20, because the liquid level does not cover the gap 20 between these rods and the corresponding rods 14b and 14c. At position 4, however, the pulse applied to crystal 30d is received by crystal 31d because the liquid in the tank covers the gap between rods 12d and 14d, and the liquid being a good conductor of ultrasonic vibrations, the pulse is received. This is disclosed by the oscilloscope at position 4 where the sweep is deflected. Similarly, deflections are received at positions 5 and 6, corresponding to the travel of the pulses through the rods 12e and 12f to their cooperating rods 14e and 14f. Therefore, the first pulse to be indicated along the oscilloscope sweep is a measure of the depth of liquid in the tank, and the sweep of the oscilloscope may be calibrated directly in terms of linear depth within the tank.

A continuous rod 50 without any gap or other discontinuity therein may be provided with a transmitting crystal 50a and a receiving crystal 50b so that the pulse will always be transmitted therethrough regardless of liquid level and thus give an indication of the operativeness of the system and provide a calibrating position for setting the start of the sweep.

The number and positioning of the pairs of rods within a tank may be varied for finer or coarser indication.

Having described our invention, what we claim and desire to secure by Letters Patent is:

1. A device for indicating the level of liquid within closed containers, comprising a plurality of pairs of sound-conducting members extending into the container, one member of each pair extending into the container through the top thereof, the cooperating member of each pair extending into the container through the bottom thereof, the ends of the members of each pair within the container being spaced apart normally to prevent passage of ultrasonic vibrations from one member of a pair to the other member in the absence of liquid spanning the space, the spaces between the respective pairs occurring at different distances above the bottom of the container, means for generating ultrasonic pulses, means for transmitting said pulses into the members extending into the top of the container, means connected to the members extending into the bottom of the container for receiving said pulses, the total length of said pairs of conducting members and their spacing varying progressively to provide different traverse times for the passage of the generated pulses, and means for indicating the received pulses.

2. A liquid level indicating device as specified in claim 1 in which the means for transmitting said pulses into the members extending into the top of the container are piezoelectric transducers energized by the pulse generating means and connected to said members, and the means connected to the members extending into the bottom of the container for receiving said pulses are piezoelectric transducers connected to said indicating means.

3. A liquid level indicating device as specified in claim 2 in which all transmitting transducers are connected in parallel and all receiving transducers are connected in parallel.

4. A liquid level indicating device as specified in claim 3 in which the means for indicating the received pulses includes an oscilloscope having a sweep generator, means for synchronizing the sweep generator with the pulse generating means and means for deflecting the sweep by the pulses received by the receiving transducers.

References Cited in the file of this patent

UNITED STATES PATENTS

| | | |
|---|---|---|
| 2,534,006 | De Lano et al. | Dec. 12, 1950 |
| 2,713,263 | Turner | July 19, 1955 |
| 2,746,480 | Hildyard | May 22, 1956 |
| 2,787,158 | Valkenburg et al. | Apr. 2, 1957 |

FOREIGN PATENTS

| | | |
|---|---|---|
| 736,464 | Great Britain | Sept. 7, 1955 |